March 9, 1943.  J. S. SHERER, JR., ET AL  2,313,590
LAWN MOWER
Filed May 26, 1941    2 Sheets-Sheet 1
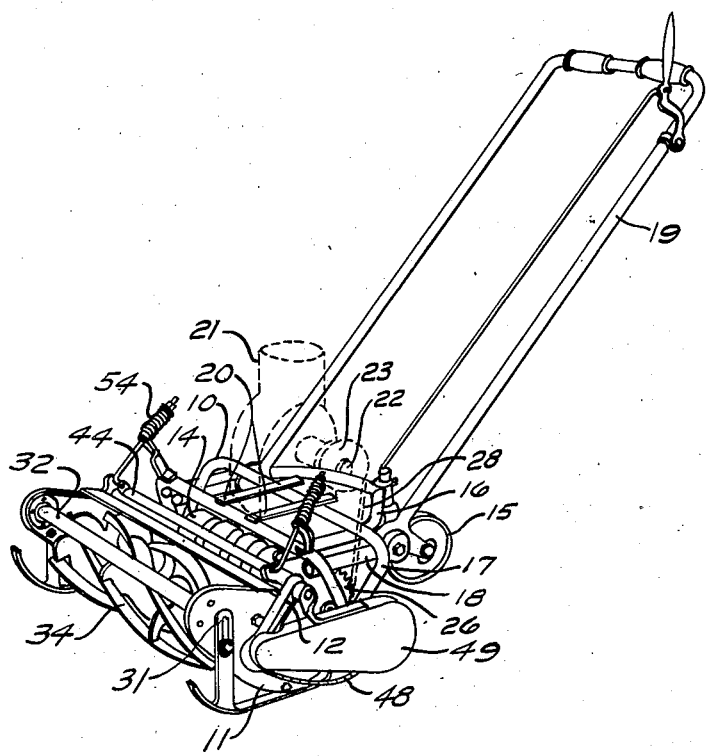
FIG. 1
FIG. 4
INVENTOR.
JOSEPH S. SHERER JR.
and
BY ARTHUR J. RICHARDS
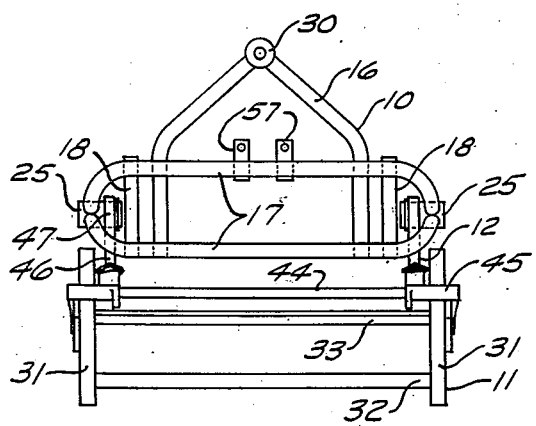

March 9, 1943.  J. S. SHERER, JR., ET AL  2,313,590
LAWN MOWER
Filed May 26, 1941  2 Sheets-Sheet 2

INVENTOR.
JOSEPH S. SHERER JR.
and
BY ARTHUR J. RICHARDS

Patented Mar. 9, 1943

2,313,590

UNITED STATES PATENT OFFICE 2,313,590

LAWN MOWER

Joseph S. Sherer, Jr. and Arthur J. Richards, Lansing, Mich., assignors to Ideal Power Lawn Mower Company, Lansing, Mich., a corporation of Michigan Application May 26, 1941, Serial No. 395,164

7 Claims. (Cl. 56—26)

This invention relates to power driven lawn mowers of the type comprising a traction unit and a cutting unit connected together by an articulated connection. More particularly, the invention relates to the means for connecting the two units together.

The invention is particularly applicable to lawn mowers having a single cutting unit, and while suitable for all around use, is especially adapted for trimming the edges of lawns and working in relatively close quarters where larger mowers are unsuitable. Lawn mowers of this type must be capable of closely following the contour of the ground in a longitudinal direction, but must be prevented from tilting laterally in order to permit cutting of overhanging edges without "scalping" the turf.

Accordingly, the principal object of this invention is to provide a lawn mover having a cutting unit which is partially supported by the traction unit in such manner that the cutting unit freely follows the general contour of the ground in a fore and aft direction, but is prevented from lateral tilting relative to the traction unit.

This object is attained by connecting the cutting unit to the traction unit by a rigid connecting frame which constitutes the sole driving connection between the units. The connecting frame is pivotally connected to the traction unit on the drive shaft axis only, and pivotally connected to the cutting unit on the cutting reel axis only. Thus, the cutting unit may tilt forwardly and rearwardly about its pivotal connection about the connecting frame and also swing about the pivotal connection of the connecting frame with the traction unit.

Another object of the invention is to provide a lawn mower having a cutting unit so connected to the traction frame that the cutting unit may be raised to a transporting position clear of the ground and carried entirely by the traction frame, but can be operated in that position to cut grass at a greater than normal height.

Still another object of the invention is to provide novel adjustable ground engaging means for the cutting unit to maintain the cutting unit in a predetermined relationship to the ground.

These objects and others ancillary thereto will become more fully apparent in the following specification, when read in connection with the accompanying drawings, wherein:

Figure 1 is a perspective view of a lawn mower embodying the invention;

Figure 4 is a plan view of the traction unit frame, the cutting unit frame, and the rigid connecting frame of the mower.

Figure 2:
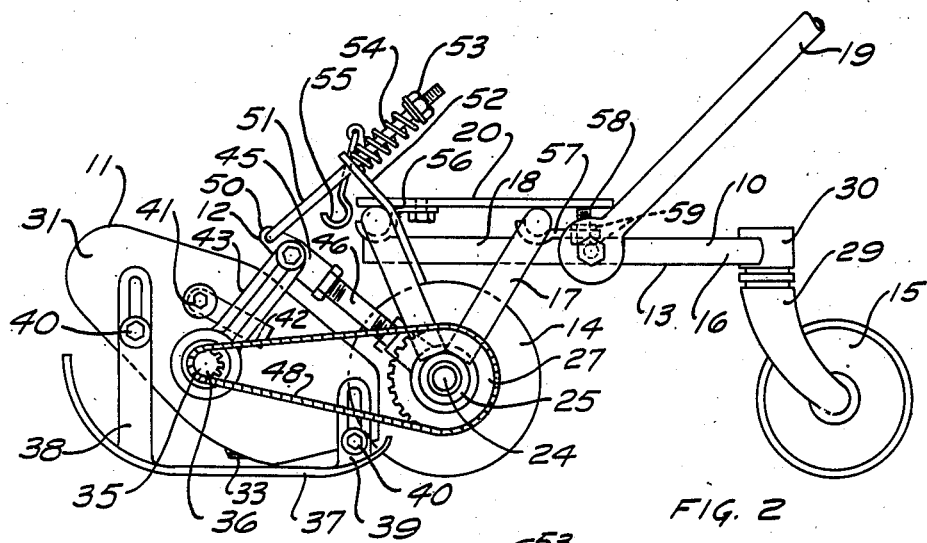
Figure 2 is a fragmentary left hand side elevational view of the lawn mower with certain parts removed in order to more clearly disclose the construction thereof.

The lawn mower disclosed in the drawings comprises in general three parts, a traction unit 10, a cutting unit 11, and a connecting frame 12. The traction unit and the cutting unit are articulated together by means of the connecting frame 12.

The traction unit 10 comprises a main frame 13 supported by ground engaging wheels 14 and 15. The main frame 13 is fashioned from lengths of cylindrical pipe welded together. The frame consists of a single longitudinal member 16 bent into a V-shape, as shown in Figure 1, and a pair of generally U-shaped transverse members 17. The bases of the U-shaped members 17 are spread a substantial distance apart (see Figure 2) and are welded to the legs of the V-shaped longitudinal member 16. The free lower ends of the member 17 are preferably in contact with each other and are also welded together. A pair of short handle supporting members 18 are welded to the U-shaped members 17. A handle 19 is pivotally connected to the rear ends of the members 18, and may be clamped in any desired angular position thereon.

A gasoline driven motor 21, having a drive shaft 22 on which is mounted a sprocket 23, is securely fastened to a motor supporting frame. The motor supporting frame comprises two longitudinally extending parallel bars 20 which are pivotally attached adjacent their front ends to the front transverse member 17. The pivotal attachment is effected by a hook shaped member 56 bolted to each bar 20 and which cooperates with the bar 20 to embrace the front member 17. Welded to the rear transverse member 17 beneath each bar 29 is another hook shaped member 57. A bolt 58 is secured to each bar 20 and projects downwardly therefrom through a hole in the corresponding member 57. A pair of nuts 59 are threaded onto each bolt on opposite sides of the adjacent member 57. The nuts are adapted to be clamped to the members 57, and by suitable adjustment may be made to raise and lower the rear end of the motor supporting frame and the motor thereon for a purpose which will appear presently.

The wheels or drive rollers 14 are mounted on a transverse axle 24, journaled in bearings 25 which are rigidly attached to the lower ends of the U-shaped members 17. Preferably there are a plurality of the wheels 14 axially spaced on the axle 24. They are arranged entirely within the path of cut of the cutting unit 11. Two sprockets 26 and 27 are keyed to the axle 24. The sprocket 26 is connected by a chain to the sprocket 23 on the motor shaft so that the axle 24 may be driven from the motor. Sprocket 27 serves as a driving member for the cutting reel, as will be described presently. The chain 28 may be maintained at the proper tension by means of the adjusting nuts 59 previously described. That is to say, by raising or lowering the rear edges of motor supports 20, the chain 28 may be tightened or loosened.

The wheel 15 is a single caster wheel pivotally attached to a downwardly extending support 29. The support 29 is journaled in a vertical bearing 30 welded to the rear end of the longitudinal member 16 of the frame 13.

The cutting unit 11 comprises a pair of end plates 31 connected together by a transverse bar 32 and a stationary cutter bar 33. Approximately centrally of the end plates 31, a cutting reel shaft 35 is journaled. The cutting reel shaft 35 carries a cutting reel 34. The left hand end of the cutting reel shaft 35 projects through the adjacent end plate and a sprocket 36 is keyed thereto. On each end plate 31 adjacent the cutting reel shaft 35 are two stops 41 and 42, the purpose of which will appear presently.

A ground engaging shoe 37 is attached to each end plate. The ground engaging shoes are metal strips bent to the contour shown best in Figures 2 and 3. Each ground engaging shoe 37 is provided adjacent its front and rear ends with vertical supports 38 and 39. The supports 38 and 39 are slotted and are connected to the end plates 31 by means of bolts 40. The bolts 40 are adapted to clamp the supports 38 and 39 to the end plates 31, but when the bolts are loosened the supports can be adjusted vertically relative to the end plates whereby to permit adjustment of the height of the cut of the cutting unit.

The traction unit 10 and the cutting unit 11 are connected together by the rigid connecting frame 12 mentioned previously. This frame consists of a pair of rigid angular arms 43 and a transverse tie rod 44. Each arm 43 comprises a one piece casting 45, the forward end of which is mounted on the cutting reel shaft 35 for pivotal movement relative thereto. The upwardly and rearwardly inclined portion of the casting 45 extends between the stops 41 and 42 whereby to limit the pivotal movement of the cutting unit relative to the arms 43. The rear end of the casting 45 is threadedly secured to a short rod 46 which is in turn threadedly attached to a journal 47 pivotally mounted on the outside of the bearing 25 for the axle 24. The rod 46 is threaded to permit of a limited amount of adjustment of the length of the arms 43. Preferably the ends of the tie rod 44 are received in sockets in the arms 43 and are pinned thereto whereby to prevent relative movement of the two arms 43.

Each arm 43 is provided with a short projection 50 to which is connected a link 51. The links 51 extend upwardly and rearwardly and pass through apertures in brackets 52. These brackets 52 are welded or otherwise rigidly attached to the traction frame. The ends of the links 51 are threaded and provided with nuts 53. A coil spring 54 surrounds each link 51 and is interposed between the adjacent surface of the bracket 52 and the nuts 53. The spring 54 is placed in compression by adjusting the nut 53 whereby to partially counterbalance the weight of the cutting unit from the main or traction frame.

Figure 3:
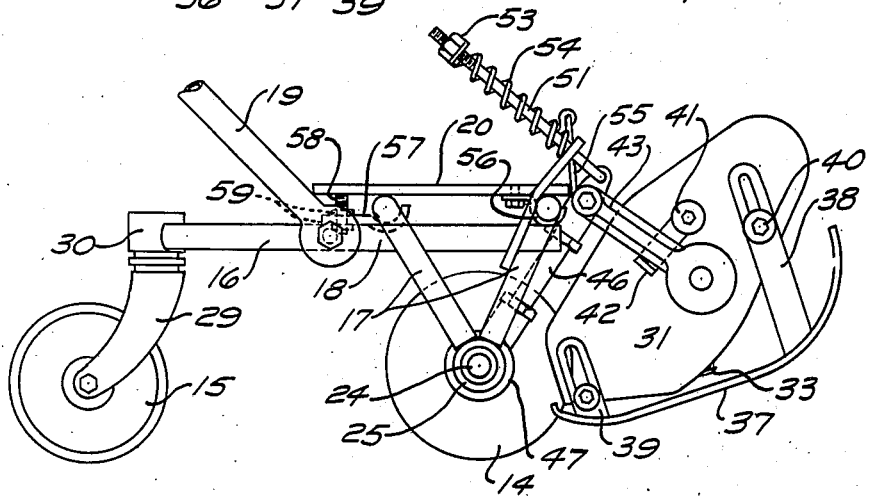
Figure 3 is a right hand side elevational view showing the cutting unit in its raised transporting position.

A hook 55 is pivotally secured to the traction unit in any suitable position and is adapted to engage the tie rod 44 when desired to hold the cutting unit in an elevated position, such as that shown in Figure 3.

The sprocket 27 on the axle 24 is connected to the sprocket 36 on the cutting reel shaft 35 by means of a chain 48. Preferably a chain housing 49 encloses the chain 48 and is secured to the adjacent end of the tie rod 44.

In its normal operation the cutting unit is in the position shown in Figures 1 and 2. In that position the ground engaging shoes 37, while not carrying all of the weight of the cutting unit 11, are in contact with the ground and wholly determine the position of the cutting unit relative to the ground. A part of the weight of the cutting unit 11 is carried on the traction unit through springs 54 to facilitate turning of the mower. The cutting unit is propelled by means of the rigid connecting frame 12 as the lawn mower moves forwardly. When so propelled the cutting unit is free to pivot about the axis of the cutting reel shaft 35, so as to take care of small depressions or humps in the ground. The cutting unit also may swing about the axis of the axle 24 in case of relatively deep depressions or large protuberances on the ground. The pivotal movement of the cutting unit about the cutting reel shaft 35 is limited by the stops 41 and 42.

The driving force for the lawn mower is applied from the motor through the sprockets 23 and 26 and chain 28 to the axle 24. The rotary force applied to the axle is transmitted to the wheels 14, thereby causing the lawn mower to move along the ground. The sprockets 27 and 36 and the chain 48 transmit the drive from the axle 24 to the cutting reel shaft 35. Thus, the axle 24 is both a driven and a driving shaft. This construction eliminates the need for a jack shaft, such as is commonly employed.

From the foregoing it will be seen that this construction is such that the cutting unit may closely follow the contour of the ground in a longitudinal direction. The cutting unit cannot tilt laterally relative to the traction unit, however, because the rigid connecting frame 12 prevents it. Therefore, the mower may be operated on lawns having overhanging edges, such as flower beds, curbs and the like, without damaging either the mower or the turf. If one of the ground engaging shoes is suspended over a depression, the entire support for the cutting unit is transmitted to the traction unit and the other ground engaging shoe.

At times it is desirable to be able to cut grass to a height considerably greater than normal. In that case, the cutting unit is raised so that the hook 55 can be engaged with the tie rod 44 and the lawn mower can then be operated with the cutting unit clear of the ground. Of course, the cutting unit need not be operated in this position, but may be raised simply for ease in transporting the mower from place to place.

The scope of the invention is indicated in the appended claims.

We claim:

1. In a mower of the pusher type, the combination with a traction unit and a cutting unit of means for communicating forward movement of the traction unit to the cutting unit consisting of a rigid frame interconnecting the two units, said frame having one end pivotally connected to the traction unit on a transverse axis for pivotal movement in either direction about said transverse axis, the cutting unit being pivotally connected to the other end of the frame on a transverse axis for pivotal movement relative to the frame in either direction about said last named transverse axis, whereby the cutting unit is free to move in either direction about both transverse axes.

2. A mower as defined in claim 1 wherein the cutting unit is provided with means engageable with the frame for limiting the pivotal movement of the cutting unit relative to the frame.

3. A mower as defined in claim 1 wherein resilient means is connected to the traction unit and to the frame at a point remote from the pivotal connection between the traction unit and the frame for limiting the pivotal movement in one direction of the frame relative to the traction unit.

4. In a mower, the combination with a traction unit and a cutting unit of means providing a driving connection between said units comprising a rigid frame, said frame comprising a pair of rigid members of inverted V-shape and a rigid bar connecting the apexes of the members, the free end of one leg of each member being pivotally connected to the traction unit on a transverse axis for pivotal movement about said transverse axis, resilient means connected to the traction unit and to said frame at a point remote from said transverse axis for limiting the pivotal movement in one direction of said frame relative to the traction unit, said cutting unit being pivotally connected on a transverse axis to the free ends of the other legs of said members for pivotal movement about said last named transverse axis.

5. A mower as defined in claim 4 wherein the cutting unit is provided with means engageable with said frame for limiting the pivotal movement of the cutting unit relative to the frame.

6. A mower as defined in claim 4 wherein said resilient means comprises a coil spring connected at one end to the traction unit and at the other end to the apex of said frame.

7. A mower as defined in claim 4 wherein the length of one arm of each of said frame members is adjustable.

JOSEPH S. SHERER, JR.
ARTHUR J. RICHARDS.